United States Patent [19]
Van der Perk

[11] 3,848,456
[45] Nov. 19, 1974

[54] TESTING APPARATUS FOR SHOCK ABSORBERS ON VEHICLES

[75] Inventor: Klaas Anthonie Jacob Van der Perk, Oud-Beijerland, Netherlands

[73] Assignee: ITT Industries, Inc., New York, N.Y.

[22] Filed: Apr. 4, 1973

[21] Appl. No.: 347,900

[52] U.S. Cl. .................................... 73/11, 73/71.7
[51] Int. Cl. ........................................ G01m 17/04
[58] Field of Search ............................. 73/11, 71.7

[56] References Cited
FOREIGN PATENTS OR APPLICATIONS
470,660  5/1969  Switzerland............................ 73/11
2,068,853  3/1971  France................................... 73/11

*Primary Examiner*—James J. Gill
*Assistant Examiner*—Anthony V. Ciarlante
*Attorney, Agent, or Firm*—Delbert P. Warner; James B. Raden

[57] ABSTRACT

Testing apparatus for shock absorbers on vehicles is equipped to enable measurements of the shock absorbers. It includes means enabling the subsequent release of lever arms of the apparatus after a test to enable removal of the vehicle from the apparatus without damage to either the apparatus or the vehicle.

7 Claims, 5 Drawing Figures

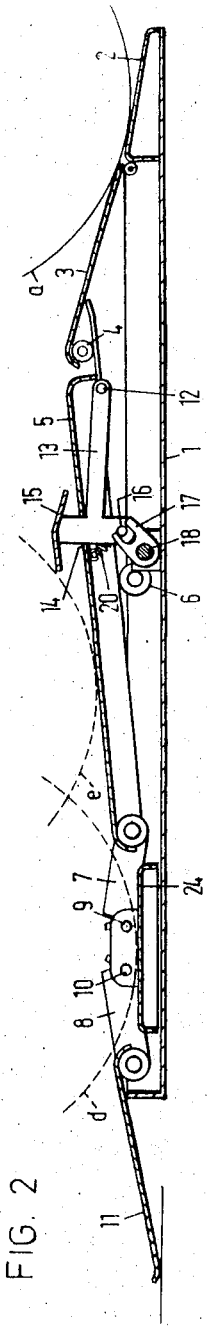
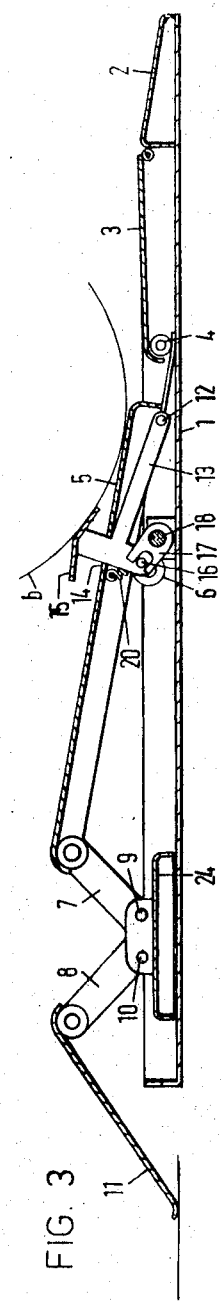
FIG. 2
FIG. 3

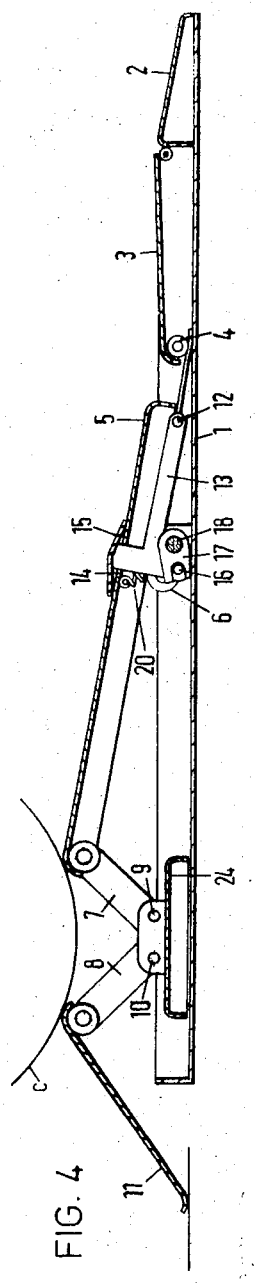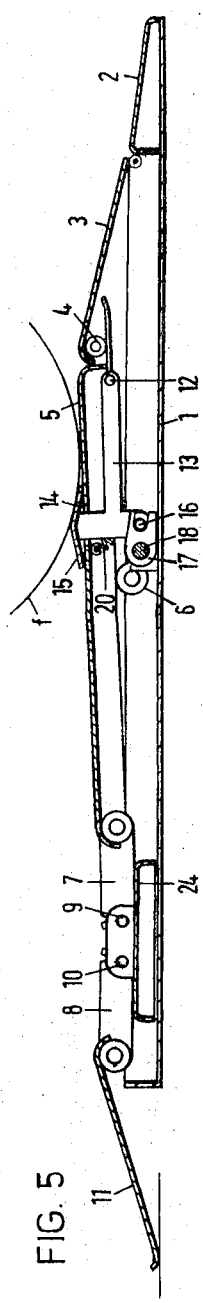

TESTING APPARATUS FOR SHOCK ABSORBERS ON VEHICLES

BACKGROUND OF THE INVENTION

1. Field of the Invention

The invention relates to testing apparatus for shock absorbers on vehicles. In particular, it relates to testing apparatus of use where the test vehicle is positioned with two adjacent wheels on supporting means forming part of the test apparatus. It relates further to a novel arrangement of the test apparatus which prevents damage to the test vehicle when it is removed from the test apparatus.

2. The Prior Art

Apparatus similar to that shown for embodiments of the present invention is known from German Petty Patent 7,141,942. On said apparatus the vehicle moves downward under gravity after a lock has been released until the wheels come to rest on the base plate. During this time, the vertical spring motion of the vehicle body can be registered on a registering device.

When the vehicle rolls onto the unlocked apparatus each of the pairs of supporting means is urged into an upraised position by the action of the first lever under action of the pressure of the vehicle wheels. In this position the supporting means are maintained in said locked position.

After release of the lock and the subsequent fall of the vehicle, in course of the subsequent rolling off of the vehicle, at a certain position thereof similar circumstances arise on said first lever as at the rolling on; indeed in the same way the supporting means are urged to their upraised position under action of the pressure of the vehicle wheels.

This mode of operation presents a serious drawback, when after having tested successively the shock absorbers of the front wheels and the rear wheels, the vehicle is being driven in reverse direction, because the supporting means, now being urged by the rear wheels in said upraised position, could damage lower parts of the vehicle body, while moreover the first pair of wheels has to overcome the upraised supporting means.

SUMMARY OF THE INVENTION

The invention relates to testing apparatus for shock absorbers on vehicles, in which the vehicle is positioned with two adjacent wheels on a pair of supporting means and in which each pair of supporting means consists of wheel supports which are jointed through pivot-like means to a base plate. The supporting means are brought to an upraised position by a first lever which is borne by a roller support on the base plate and which can be displaced under action of the pressure of the vehicle wheel. The lever is then locked relative to the base plate by means of a second lever jointed in pivot-like manner to said first lever. The second lever cooperates in the end position corresponding to said upraised position with a third lever rotatable over a restricted angle at said base plate, said third lever being connected to an operating lever so as to release the locking.

It is an object of the present invention to provide means allowing said supporting means to be exclusively brought to said upraised position in course of the rolling on of the vehicle.

In accordance with a first characteristic of the invention in a test apparatus of the above-defined type, the second and third levers are jointed by a pivot-like mechanism and also cooperate with each other in the end position of said first lever corresponding with the lowered position of said wheel supports such, that locking is allowed to become operative in either end position of said first lever.

Thus, the locking becomes operative to maintain the supporting means in their upraised position during the rolling on of the vehicle as well as to maintain the supporting means in their lowered position during the rolling off of the vehicle. In order to be able to re-operate the apparatus at the rolling on of the next vehicle, according to a further characteristic of the invention the locking means is held inoperative by action of a spring in the unloaded position of the testing apparatus and is urged in the locked position under action of the pressure of the vehicle wheel.

BRIEF DESCRIPTION OF THE DRAWINGS

The above and other objects and characteristics of the invention will be better understood from the following detailed description of an embodiment in conjunction with the accompanying drawings in which:

FIG. 2 is a longitudinal section according to line II—II of FIG. 1; and

FIGS. 3, 4 and 5 show the apparatus according to FIG. 2 in different phases during the rolling on and off of a vehicle wheel.

DESCRIPTION OF A PREFERRED EMBODIMENT

Figure 1:
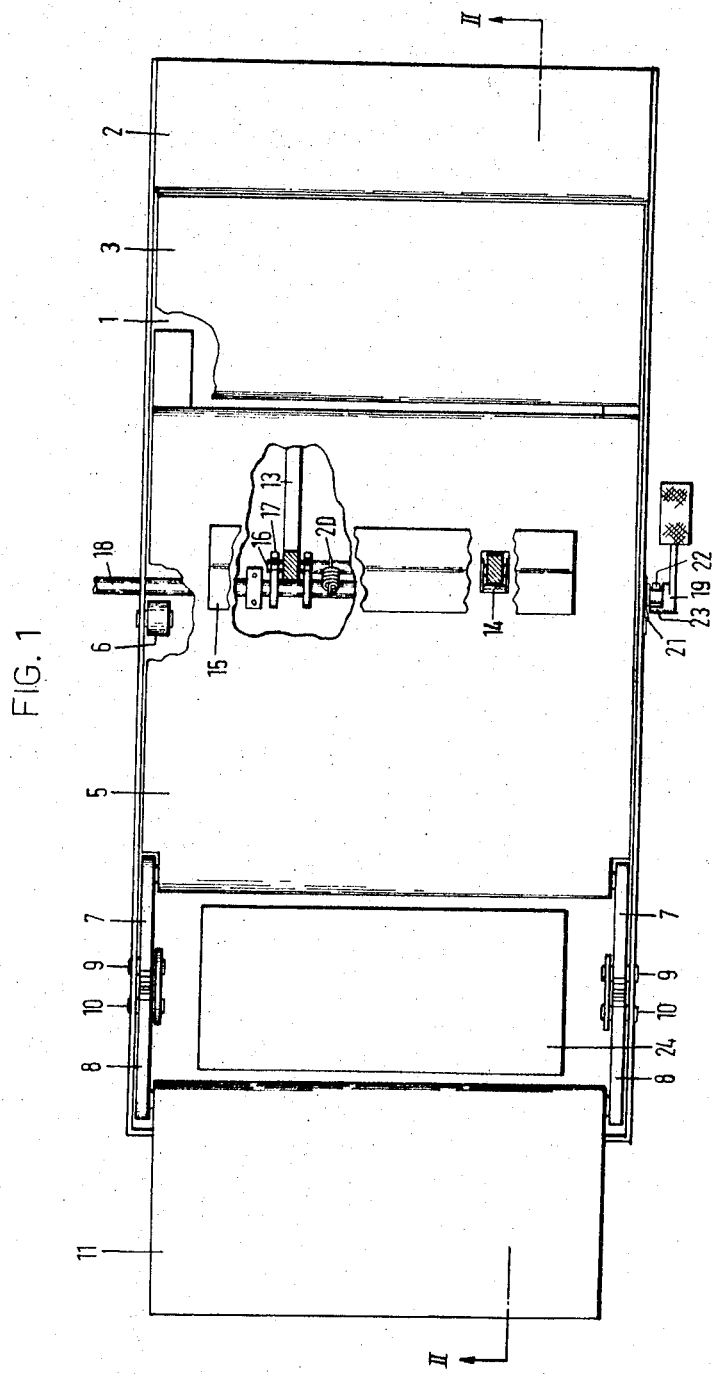
FIG. 1 is a top view of parts of the testing apparatus according to the invention, arranged to accomodate a single wheel of a vehicle, in the unloaded position of the apparatus.

Referring to FIG. 1, the testing apparatus has a base plate 1 to which a fixed ascent plate 2 is secured. To the latter an ascent plate 3 is jointed by pivot-like means. The ascent plate 3 bears onto one end of a first lever 5 by means of rollers 4. The lever 5 resting on the base plate 1 by means of rollers 6 and having its other end jointed by pivot-like means to a pair of wheel supports 7, 8 which are jointed to a wheel plate 24 through pivots 9, 10 in an opposite rotatable way.

An ascent plate 11 has its one end jointed pivot-like to the wheel support 8 and its other end resting on the flooring of the workshop.

Lever 5 is rotatably jointed by means of pivots 12 to a pair of levers 13. The pair of levers 13 extend through apertures 14 in the upper face of lever 5 and are jointed to a strip 15 and an underlying axle 16.

The ends of levers 17 surround the axle 16, said levers being secured to axle 18, which is rotatably fastened to base plate 1. The axle 18 extends to the other side of the base plate 1 to the corresponding part (not shown, but similar to the part shown in FIG. 1) of the testing apparatus arranged to accomodate the adjacent vehicle wheel, said axle having its other end secured to a foot operated lever 19.

Tension springs 20 are arranged between the axle 16 and the lever 5 while a spring 21 urges the foot operated lever 19 in an upraised position.

The lever 19 rotatably engages the axle 18 and is arranged to cooperate with a cam 22, arranged on the axle 18.

The operation of the apparatus will now be described.

During rolling on of a vehicle wheel onto the fixed ascent plate 2 the apparatus remains in the position of rest indicated in FIGS. 1 and 2, until the wheel reaches the position a as indicated in FIG. 2.

The vehicle continuing on its path, the ascent plate 3 will press down the lever 5 under action of the wheel pressure and by means of the rollers 4. By this action lever 5 will reach the position indicated in FIG. 3 by pivoting about the roller support 6. By this swing of lever 5 the levers 17 have been rotated as well and the wheel supports 7 and 8 will be lifted to their upraised position.

By proceeding still further on the path, the vehicle wheel will reach the position indicated at b and will start to press down the strip 15, by which pressure the levers 13 move against action of the springs 20 until the levers 17 abut against base plate 1 (see FIG. 4).

In this position the pivots 12, 16 and 18 cause the lever 5 to be locked in an unstable position, which it maintains for as long as the said lever is loaded by the proceeding vehicle wheel.

In the position indicated in FIG. 4, the wheel has reached the position indicated at c and now the apparatus is ready for the testing operation, in which the cam 22 on the axle 18 rests against the abutment 23 of the foot operated lever 19.

Operation of the lever 19 will cause the axle 16 to be displaced relatively to the pivots 12 and 18 such, that the lock is released and the wheel supports 7 and 8 swing outward and downward under action of the wheel pressure. At this time the levers 5 and 17 are moved into the position indicated in FIG. 1 and the vehicle wheel presses against the wheel plate 24 in the position indicated at d, which plate rests on the base plate 1.

The vertical spring motions caused by the vehicle can be registered by a registering device (not shown).

Subsequently, when the vehicle is rolled off of the apparatus, the apparatus will remain in the position indicated in FIG. 1 until the wheel re-engages strip 15 of levers 13 as shown in the position indicated at e.

Thereafter, the equipment locks again in the manner already described above, by which the apparatus remains in the position indicated in FIG. 5 as long as the vehicle wheel loads the lever mechanism in the position indicated by f.

After having regained the position of the vehicle wheel as indicated in FIG. 2 at a, the lock is released by the action of the springs 20 and the apparatus returns to the initial position of FIG. 1.

It will be clear that while a vehicle is moving along over plates 11 for subsequent testing of the next pair of wheels after operation of a preceding pair of wheels, the apparatus will operate during the moving on in a way substantially similar to the one indicated above. During subsequent reverse motion of the vehicle the apparatus, however, will remain locked in the lowered position indicated in FIG. 5 so that the front wheels can roll in the reverse direction unimpededly.

While the principles of the invention have been described above in connection with specific apparatus, it is to be understood that this description is made only by way of example and not as a limitation on the scope of the invention.

I claim:

1. Testing apparatus for shock absorbers on vehicles comprising supporting means upon which vehicle wheels may be positioned, said supporting means including a first lever bearing on a base plate via a roller support, said first lever occupying a first position when at rest, said first lever responding to pressure applied from a vehicle wheel to rotate about said roller support to a second position, a second lever jointed by pivot-like means to said first lever, a third lever pivoted between the second lever and the base plate, said second lever incorporating means responsive to pressure of a vehicle wheel to turn said third lever about its pivot to the base plate and lock said first lever in substantially said second position, wheel supports jointed by pivot-like means to the base plate and to the first lever, said wheel supports rising to an upraised position capable of supporting pressure from a wheel when the first lever is locked in the second position, and release means for releasing said wheel supports and permitting pressure from a wheel to turn said third lever about its pivot to the base to release the first lever from its second position and lock it in a third position, whereby the lever arms are locked in positions enabling removal of the wheels of a vehicle from the testing apparatus without damage to the apparatus or the vehicle.

2. Testing apparatus according to claim 1, in which said first lever is held inoperative by action of a spring in the unloaded position of the testing apparatus and is urged to the third locked position against the action of the spring due to changes in the pressure of the vehicle wheel.

3. Testing apparatus according to claim 2, in which the first lever is locked in the second position by action of the pressure of the vehicle wheel through said second lever against the spring.

4. Testing apparatus according to claim 1, in which an operating lever jointed to said third lever cooperatively engages said lever over a restricted portion of the rotation angle of said third lever.

5. The invention according to claim 1, in which a spring holds said first lever in its first position, the first lever is moved to its third position against the bias of the spring and is returned to the first position by action of the spring when the pressure of the vehicle wheel is removed from the testing apparatus.

6. The invention as claimed in claim 5, in which the locked position is attained through pressure of the vehicle wheel on said second lever and against the spring.

7. The invention as claimed in claim 5, in which an operating lever jointed to said third lever cooperatively engages said third lever over a restricted portion of the rotation angle of said third lever.

* * * * *